UNITED STATES PATENT OFFICE.

JOHN DIMELOW, OF AUSTIN, TEXAS, ASSIGNOR TO WILLIAM AUGUSTUS ECKERLY, OF SAME PLACE.

IMPROVEMENT IN THE MANUFACTURE OF HYDRAULIC STONE.

Specification forming part of Letters Patent No. 219,570, dated September 16, 1879; application filed February 25, 1879.

*To all whom it may concern:*

Be it known that I, JOHN DIMELOW, of Austin, in the county of Travis and State of Texas, have invented a new and useful Improvement in the Manufacture of Hydraulic Stone, of which the following is a specification.

The object of this invention is to furnish an improved artificial stone for use in building piers, sewers, buildings, foot and street pavements, and for all other purposes for which stone and brick are now used, and which shall be so compounded that it will constantly become harder when exposed to air and moisture, will resist all changes of temperature, even the most intense heat and cold, without being affected, and may be exposed to strong fires without cracking or being otherwise injured.

The invention consists in an artificial stone formed of hydraulic cement, hard clinker, soft clinker, and water, in substantially the manner hereinafter set forth and described.

In preparing my improved hydraulic stone the hydraulic cement is prepared of waste materials, as set forth in Letters Patent No. 205,253, granted to me June 25, 1878; or, if desired, Portland cement or other cement may be used.

The clinker is prepared as follows: Decomposed refuse, or rejected limestone, lime-refuse, or rejected marble or shells, either calcined or not, are cast in their crude state into a grinding-mill, with argillite or rejected clays or river-deposit, in about equal quantities. The proportional quantities of the two materials may be varied for producing different varieties of stone.

The two substances are ground together to a powder, and the powder is put to soak in water for not less than twelve hours, or over night. When thoroughly soaked the substance, in a damp or wet condition, is passed through a machine like a brickmaker's pug-mill, and is then pressed into bricks or chunks, and conveyed to drying-sheds, where they are allowed to dry. When thoroughly dry the bricks or chunks are taken to a furnace built expressly for burning them, at a high pitch of white heat, into a solid hydraulic clinker of a hard character. About one-third of the substance is less burned, so as to produce a soft clinker.

The clinker, when properly burned, is taken to a mill and ground into a powder of various fineness, according as the purpose for which the stone is to be used may require. One part of hydraulic cement, two parts of soft clinker, and six parts of hard clinker are mixed together with water, and are molded or pressed into bricks, blocks, roofing-tiles, pavement-blocks, sewer-tubes, or other shape, as the purpose for which the stone is to be used may require, and are taken to the drying-shed to dry.

The stone thus prepared, after being taken from the furnace, will continue to increase in hardness and beauty, and consequently in quality and value.

This stone will be unaffected by dryness or moisture, by changes in the atmosphere, or by changes of temperature, whether the said changes be gradual or sudden, and whether they be slight or great.

This stone is an improvement on the concrete, from the fact that it is a solid mass of hydraulic matter or cement, possessing the valuable property of hardening by absorption of carbonic acid to a much greater extent than the said concrete made from cement, sand, and stone.

Having thus described my invention, I claim as new and desire to secure by Letters Patent—

An artificial stone formed of hydraulic cement, hard clinker, soft clinker, and water, substantially in the manner herein described and set forth.

JOHN DIMELOW.

Witnesses:
  JAMES E. RECTOR,
  EDWD. McDOWELL.